(12) United States Patent
Iyigun et al.

(10) Patent No.: US 10,515,019 B1
(45) Date of Patent: Dec. 24, 2019

(54) UPDATING AGING INFORMATION USING SECOND-LEVEL ADDRESS TRANSLATION FOR VIRTUAL ADDRESS-BACKED VIRTUAL MACHINES

(71) Applicant: Microsoft Technology Licensing, LLC, Redmond, WA (US)

(72) Inventors: Mehmet Iyigun, Kirkland, WA (US); Yevgeniy Bak, Redmond, WA (US); Landy Wang, Honolulu, HI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/121,488

(22) Filed: Sep. 4, 2018

(51) Int. Cl.
*G06F 12/00* (2006.01)
*G06F 12/1009* (2016.01)

(52) U.S. Cl.
CPC .... *G06F 12/1009* (2013.01); *G06F 2212/651* (2013.01)

(58) Field of Classification Search
None
See application file for complete search history.

*Primary Examiner* — Midys Rojas
(74) *Attorney, Agent, or Firm* — Workman Nydegger

(57) ABSTRACT

Updating aging information for memory backing a virtual address-backed virtual machine (VM). A virtual memory address (VA) is allocated, within a page table entry (PTE), to a process backing the VM. Based on memory access(es) by the VM to a non-mapped guest-physical memory address (GPA), the GPA is identified as being associated with the VA; an HPA is allocated for the accessed GPA; a host-physical memory address (HPA) is associated with the VA within the PTE; the GPA is associated with the HPA within a second level address translation (SLAT) structure entry; and an accessed flag is set within the SLAT entry. Aging information is updated, including identifying the SLAT entry; querying a value of the accessed flag in the SLAT entry; clearing the accessed flag in the SLAT entry without invalidating the SLAT entry; and updating aging information for the VA and/or HPA based on the queried value.

20 Claims, 10 Drawing Sheets

_200a_

| Page Table 201a | | |
|---|---|---|
| Virtual Address | Host Phys. Addr. | Accesed |
| VA1 | | |
| VA2 | | |
| VA3 | | |
| VA4 | | |
| VA5 | | |
| VA6 | | |
| VA7 | | |
| VA8 | | |
| VA9 | | |
| VA10 | | |
| VA11 | | |
| ... | | |

| TLB 202a | | |
|---|---|---|
| Virtual Address | Host Phys. Addr. | Accessed |
| | | |
| | | |
| | | |
| ... | | |

| SLAT 203a | | |
|---|---|---|
| Guest Phys. Addr. | Host Phys. Addr. | Accessed |
| | | |
| | | |
| | | |
| ... | | |

| Page Table 201b | | |
|---|---|---|
| Virtual Address | Host Phys. Addr. | Accesed |
| VA1 | | |
| VA2 | HPA2 | 1 |
| VA3 | | |
| VA4 | | |
| VA5 | | |
| VA6 | | |
| VA7 | | |
| VA8 | | |
| VA9 | | |
| VA10 | | |
| VA11 | | |
| ... | | |

| TLB 202b | | |
|---|---|---|
| Virtual Address | Host Phys. Addr. | Accessed |
| | | |
| VA2 | HPA2 | 1 |
| | | |
| ... | | |

| SLAT 203b | | |
|---|---|---|
| Guest Phys. Addr. | Host Phys. Addr. | Accessed |
| | | |
| GPA2 | HPA2 | 1 |
| | | |
| ... | | |

| Page Table 201c | | |
|---|---|---|
| Virtual Address | Host Phys. Addr. | Accesed |
| VA1 | HPA1 | 1 |
| VA2 | HPA2 | 1 |
| VA3 | HPA3 | 1 |
| VA4 | | |
| VA5 | | |
| VA6 | | |
| VA7 | | |
| VA8 | | |
| VA9 | | |
| VA10 | | |
| VA11 | | |
| ... | | |

| TLB 202c | | |
|---|---|---|
| Virtual Address | Host Phys. Addr. | Accessed |
| VA1 | HPA1 | 1 |
| VA2 | HPA2 | 1 |
| VA3 | HPA3 | 1 |
| ... | | |

| SLAT 203c | | |
|---|---|---|
| Guest Phys. Addr. | Host Phys. Addr. | Accessed |
| GPA1 | HPA1 | 1 |
| GPA2 | HPA2 | 1 |
| GPA3 | HPA3 | 1 |
| ... | | |

| Page Table 401b | | |
|---|---|---|
| Virtual Address | Host Phys. Addr. | Accesed |
| VA1 | HPA1 | 1 |
| VA2 | HPA2 | 1 |
| VA3 | HPA3 | 1 |
| ... | | |

| Mappings 405b | |
|---|---|
| Virtual Address | Guest Phys. Addr. |
| VA1 | GPA1 |
| VA2 | GPA2 |
| VA3 | GPA3 |
| ... | |

| TLB 402b | | |
|---|---|---|
| Virtual Address | Host Phys. Addr. | Accessed |
| VA1 | HPA1 | 1 |
| VA2 | HPA2 | 1 |
| VA3 | HPA3 | 1 |
| ... | | |

| SLAT 403b | | |
|---|---|---|
| Guest Phys. Addr. | Host Phys. Addr. | Accessed |
| GPA1 | HPA1 | 1 → 0 |
| GPA2 | HPA2 | 0 |
| GPA3 | HPA3 | 0 |
| ... | | |

| Aging 404b | |
|---|---|
| HPA1 | 0 |
| HPA2 | 1 |
| HPA3 | 1 |

| Page Table 401c | | |
|---|---|---|
| Virtual Address | Host Phys. Addr. | Accesed |
| VA1 | HPA1 | 1 |
| VA2 | HPA2 | 1 |
| VA3 | HPA3 | 1 |
| ... | | |

| Mappings 404c | |
|---|---|
| Virtual Address | Guest Phys. Addr. |
| VA1 | GPA1 |
| VA2 | GPA2 |
| VA3 | GPA3 |
| ... | |

| TLB 402c | | |
|---|---|---|
| Virtual Address | Host Phys. Addr. | Accessed |
| VA1 | HPA1 | 1 |
| VA2 | HPA2 | 1 |
| VA3 | HPA3 | 1 |
| ... | | |

| SLAT 403c | | |
|---|---|---|
| Guest Phys. Addr. | Host Phys. Addr. | Accessed |
| GPA1 | HPA1 | 1 → 0 |
| GPA2 | HPA2 | 1 → 0 |
| GPA3 | HPA3 | 0 |
| ... | | |

| Aging 404c | |
|---|---|
| HPA1 | 0 |
| HPA2 | 0 |
| HPA3 | 2 |

| Page Table 401d | | |
|---|---|---|
| Virtual Address | Host Phys. Addr. | Accesed |
| VA1 | HPA1 | 1 |
| VA2 | HPA2 | 1 |
| VA3 | PAGED OUT | 0 |
| ... | | |

| Mappings 405d | |
|---|---|
| Virtual Address | Guest Phys. Addr. |
| VA1 | GPA1 |
| VA2 | GPA2 |
| VA3 | GPA2 |
| ... | |

| TLB 402d | | |
|---|---|---|
| Virtual Address | Host Phys. Addr. | Accessed |
| VA1 | HPA1 | 1 |
| VA2 | HPA2 | 1 |
| | | |
| ... | | |

| SLAT 403d | | |
|---|---|---|
| Guest Phys. Addr. | Host Phys. Addr. | Accessed |
| GPA1 | HPA1 | 0 |
| GPA2 | HPA2 | 0 |
| | | |
| ... | | |

| Aging 404d | |
|---|---|
| HPA1 | 1 |
| HPA2 | 1 |
| | |

*FIG. 4D*

UPDATING AGING INFORMATION USING SECOND-LEVEL ADDRESS TRANSLATION FOR VIRTUAL ADDRESS-BACKED VIRTUAL MACHINES

BACKGROUND

Hardware virtualization technologies enable a computer system (typically called a "host" machine or computer system) to create one or more "virtual" machines or computer systems (typically called "guests"). Thus, virtualization technologies enable a computer system running a "host" operating system to execute in isolation one or more "guest" operating systems of the same type or even of a different type. Hardware virtualization technologies come in two major forms: full virtualization and paravirtualization. Full virtualization is an almost complete simulation of actual hardware. Full virtualization allows guest operating systems and software to run unmodified on the host system, sometimes even if they are binary encoded using a different Instruction Set Architecture (ISA) from the host. Paravirtualization, on the other hand, does not simulate a full hardware environment. Instead, guest operating systems and software are executed in their own isolated domains. However, guest operating systems need to be specifically modified to run in paravirtualized environments, and typically need to be binary encoded to the same ISA as the host. The software that creates a virtual machine on the host hardware is often referred to as a hypervisor or Virtual Machine Manager (VMM).

Hardware virtualization technologies have seen a great deal of adoption in recent years, particularly with the proliferation of hosted computing environments (e.g., "cloud" computing). While virtualization can be carried out entirely in software, particularly in the context of paravirtualization the speed and efficiency of virtualization can be greatly improved with the help of microprocessor (referred to herein simply as processors or CPUs) features.

For example, like any other computer, virtual machines need access to system memory, such as Random-Access Memory (RAM). In order to facilitate providing virtual machines efficient access to system memory, many processor vendors have implemented features known generically as second level address translation (SLAT). For example, INTEL, INC's present implementation is known as Extended Page Table (EPT), while ADVANCED MICRO DEVICE, INC's (AMD's) present implementation is known as Rapid Virtualization Indexing (RVI). In general, SLAT implementations maintain an on-processor hardware cache—which is accessible by a hypervisor/VMM—that stores mappings between guest-physical memory addresses (GPAs) and host-physical memory addresses (HPAs). A guest-physical address is a "virtual" address that is presented by the host to a virtual machine as if it were an actual location (e.g., a memory page) in physical memory. A host-physical address, on the other hand, is an actual address to a location (e.g., a memory page) in real physical memory. When a SLAT structure is filled with valid GPA-to-HPA mappings for a virtual machine, this structure can be used by the hypervisor/VMM to obtain appropriate host-physical addresses for the virtual machine directly, without having to go through a context switch to a host memory manager (e.g., such as when the virtual machine tries to access the corresponding guest-physical address).

One way to provide a virtual machine with access to system memory is for the host's memory manager to allocate system memory to the virtual machine directly. In these circumstances, the SLAT structure is filled with GPA-to-HPA mappings upon instantiation, and these mappings typically remain valid the entire time the virtual machine is running. These "physical" virtual machines therefore have essentially full control over their allocated physical memory, making that physical memory unavailable to the host's memory manager for other purposes (e.g., allocation to other processes) while the virtual machine is running.

Another way to provide a virtual machine with access to system memory is for the host's memory manager to allocate virtual memory addresses, rather than host-physical addresses, to the virtual machine when it is instantiated—much as the memory manager might do when instantiating normal processes. In these circumstances, one or more host page tables are filled with the virtual memory addresses that are allocated to the virtual machine, but physical memory may not actually be allocated to each of these virtual addresses. Thus, the SLAT structure may not be filled with GPA-to-HPA mappings upon the virtual machine's instantiation; instead, these mappings are filled on-demand as the virtual machine accesses its guest-physical addresses. Use of "virtual address-backed" (VA-backed) virtual machines gives the host's memory manager essentially the same flexibility to allocate physical memory to—and deallocate physical memory from—virtual machines as it does for any other process.

A common practice when using virtual memory systems is to "trim" memory pages from running processes. In particular, a host's memory manager might occasionally "walk" a working set of valid page table entries (PTEs) for a process while updating "aging" information for the physical memory pages referenced in those PTEs. Part of this process includes clearing an accessed flag within each of those PTEs, if it is set, so that the memory manager can determine if a corresponding memory page has been accessed since the last time the working set was walked for aging information. In general, aging information tracks a notion of how long it's been since the page was last accessed, such as how "hot" or "cold" the page is (i.e., the more recently accessed the page is the "hotter" it is, and the least recently accessed the page is the "colder" it is). When there is pressure for physical memory, a memory manager might "trim" older/colder pages from a process so that it can reassign the trimmed pages to another process, while committing each trimmed page's data to secondary storage where it can be retrieved the next time the process tries to access it.

The performance of hosts and guest VMs, when using VA backed virtual machines, may be improved, as will be made clear in view of the disclosure herein.

BRIEF SUMMARY

The inventors have discovered that significant inefficiencies arise when tracking aging information for physical memory pages that are assigned to virtual address (VA)-backed virtual machines, because the act of clearing the accessed flag for a page table entry (PTE) causes a dependent entry in second level address translation (SLAT) structures to be invalidated. Thus, the next time a virtual machine accesses any guest-physical address whose entry in the SLAT was invalidated due to tracking aging information, the host system performs expensive context switches from the virtual machine to the host's memory manager (and back) so the memory manager can process a memory intercept.

At least some embodiments described herein improve the efficiencies of tracking aging information for physical memory pages that are assigned to VA-backed virtual machines. In particular, embodiments "enlighten" a host computer system's memory manager with awareness of virtualization, including SLAT. When walking a working set of PTEs for a process backing a virtual machine as part of updating aging information, this enlightened memory manager identifies that the PTEs back a virtual machine. Then, based on the PTEs backing the virtual machine, the enlightened memory manager communicates with a virtualization stack (which, in turn, communicates with a hypervisor) to identify and update corresponding entries in a SLAT structure. For each of these identified SLAT entries, the enlightened memory manager causes an accessed flag within the SLAT entry to be queried and then cleared by the hypervisor. The enlightened memory manager updates aging information based on the values queried from these SLAT entries, rather than from accessed flags in the PTEs. Notably, the enlightened memory manager leaves accessed flags in the PTEs set as part of updating the aging information, avoiding invalidation of the corresponding SLAT entries. As such, the next time the virtual machine accesses a guest-physical address (GPA) corresponding to one of these SLAT entries, the virtual machine can resolve an appropriate host-physical address (HPA) from the SLAT directly, rather than causing the host system to perform expensive context switches from the virtual machine to the memory manager (and back) so the memory manager can process a memory intercept.

Some embodiments are directed to methods, systems, and computer program products that use accessed flags in a SLAT structure to update aging information for a host-physical memory address used by a virtual address-backed virtual machines in a manner that retains validity of SLAT structure entries. These embodiments allocate, within a page table entry of a page table, a virtual address to a process backing a virtual machine. Based on one or more memory accesses by the virtual machine to a non-mapped guest-physical address, these embodiments (i) identify that the non-mapped guest-physical address is associated with the allocated virtual address, (ii) allocate a host-physical address for the accessed guest-physical address, (iii) associate, within the page table entry, a host-physical address with the virtual address; (iv) associate, within a SLAT structure entry, the guest-physical address with the host-physical address, and (v) set an accessed flag within the SLAT structure entry. These embodiments also update aging information, including (i) based at least on accessing the PTE while walking a working set of PTEs for the process, identifying the SLAT structure entry, (ii) querying a value of the accessed flag in the SLAT structure entry, (iii) clearing the accessed flag in the SLAT structure entry without invalidating the SLAT structure entry, and (iv) updating the aging information for at least one of the virtual address or the host-physical address based on the queried value of the accessed flag.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A illustrates an example that shows representations of entries in a page table, a translation lookaside buffer (TLB) and a second level address translation (SLAT) structure following initialization of a virtual machine process;

FIG. 2B illustrates an example that shows representations of entries in a page table, a TLB and a SLAT structure following handling of an intercept on a guest-physical address;

FIG. 2C illustrates an example that shows representations of entries in a page table, a TLB and a SLAT structure following handling of intercepts for three guest-physical addresses;

FIG. 4B shows an example of a page table, a TLB, a SLAT, aging information, and mappings after a second aging pass of an "enlightened" memory manager;

FIG. 4C shows an example of a page table, a TLB, a SLAT, aging information, and mappings after a third aging pass of an "enlightened" memory manager;

FIG. 4D shows an example of a page table, a TLB, a SLAT, aging information, and mappings after a fourth aging pass of an "enlightened" memory manager.

DETAILED DESCRIPTION

At least some embodiments described herein improve the efficiencies of tracking aging information for physical memory pages that are assigned to virtual address (VA)-backed virtual machines. In particular, embodiments "enlighten" a host computer system's memory manager with awareness of virtualization, including second level address translation (SLAT). When walking a working set of page table entries (PTEs) for a process backing a virtual machine as part of updating aging information, this enlightened memory manager identifies that the PTEs back a virtual machine. Then, based on the PTEs backing the virtual machine, the enlightened memory manager communicates with a virtualization stack (which, in turn, communicates with a hypervisor) to identify and update corresponding entries in a SLAT structure. For each of these identified SLAT entries, the enlightened memory manager causes an accessed flag within the SLAT entry to be queried and then cleared by the hypervisor. The enlightened memory manager updates aging information based on the values queried from these SLAT entries, rather than from accessed flags in the PTEs. Notably, the enlightened memory manager leaves accessed flags in the PTEs set as part of updating the aging information, avoiding invalidation of the corresponding SLAT entries. As such, the next time the virtual machine accesses a guest-physical address (GPA) corresponding to one of these SLAT entries, the virtual machine can resolve an appropriate host-physical address (HPA) from the SLAT directly, rather than causing the host system to perform expensive context switches from the virtual machine to the memory manager (and back) so the memory manager can process a memory intercept.

It will be appreciated that the embodiments described herein provide a significant advancement to the technological field of virtualization, and particularly virtualization that provides VA-backed virtual machines. In particular, the embodiments described herein enable a host system to track aging information for physical memory that is allocated to virtual machines, without having this mere act of bookkeeping destroy otherwise valid SLAT information that could be used later to immensely improve the performance of memory accesses by these virtual machines. This greatly decreases the computational consequences that tracking aging information imposes on both VA-backed virtual machines and hosts alike, making aging and trimming of memory backing VA-backed virtual machines much more practical and efficient then present techniques. This, in-turn, enables the host to make correct trimming decisions should paging become needed. These correct trimming decisions bring about improved performance and increased potential virtual machine density on a given host.

Figure 1:
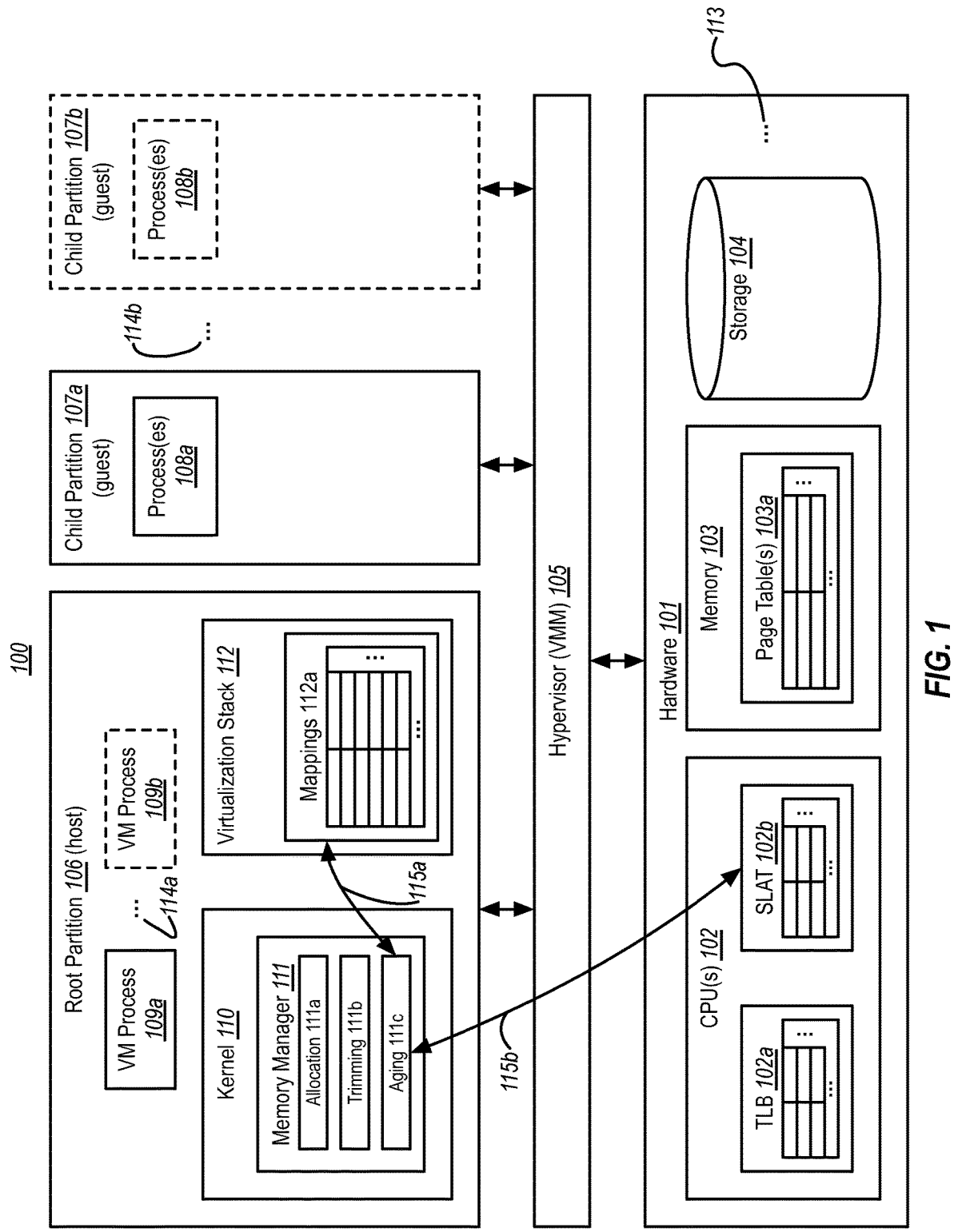
FIG. 1 illustrates an example virtualization environment that supports virtual address (VA)-backed virtual machines, and which includes an enlightened memory manager that avoids SLAT invalidations resulting from the maintenance of aging information.

In order to understand these concepts, FIG. 1 illustrates an example virtualization environment 100 that supports VA-backed virtual machines. As shown, environment 100 includes computer hardware 101 of a host system, including one or more CPUs 102, system memory 103 (e.g., RAM), and durable storage 104 (e.g., a hard disk, SSD, and the like). The ellipses 113 indicate that the computer hardware 101 can include any number of other hardware devices, such as networking hardware, input/output hardware, etc.

As shown CPU(s) 102 include a translation lookaside buffer (TLB) 102a and a SLAT structure 102b, and the system memory 103 includes page table(s) 103a. The functionality of each of these is described later. It is noted, however, that the particular structure of TLB 102a, the SLAT structure 102b, and the page table(s) 103a—and the particular data they contain—can vary greatly depending on implementation, and the embodiments herein can operate in a wide variety of implementations. As such, FIG. 1 illustrates the TLB 102a, the SLAT structure 102b, and the page table(s) 103a symbolically, as conceptually being table structures—but does not limit the particular structural form of, and data stored within, any TLB, SLAT structure, or page table discussed herein.

In FIG. 1, there are software components running on hardware 101, including a hypervisor, or virtual machine monitor (VMM) 105. As is appreciated by those of ordinary skill in the art, in paravirtualized environments a hypervisor/VMM 105 typically creates and enforced separate logical security domains, or partitions. In FIG. 1, these domains include a root partition 106 (also known as a parent partition), and one or more child partitions 107 (also known as virtual machines). As indicated, a host operating system executes within the root partition 106, while a different guest operating system executes within each child partition 107.

The hypervisor 101 grants the root partition 106 elevated privileges relative to the child partitions. These elevated privileges include, for example, generally unrestricted access to the hardware 101 and the ability to instantiate, regulate, and destroy the child partitions 107a. As shown, the root partition 106 executes an operating system kernel 110 (e.g., as part of the host operating system) and a virtualization stack 112. Although depicted as being separate from the kernel 110, the virtualization stack 112 might in some implementations be part of the kernel 110. The kernel 110 and the virtualization stack 112 cooperate to instantiate, regulate, and destroy the child partitions 107a.

As shown, the host operating system can instantiate one or more virtual machine processes 109, each corresponding to a different child partition 107a. For example, VM process 109a in the root partition 106 might correspond to child partition 107a, and VM process 109b might correspond to child partition 107b. Each VM process 109 is dedicated to hosting a memory address space for its corresponding child partition 107 (i.e., a memory spaced viewed by the child partition as being its physical address space).

When instantiating child partition 107a as a VA-backed virtual machine, the virtualization stack 112 might request that the kernel 110 instantiate VM processes 109a, and that a memory manager 111 in the kernel 110 might allocate virtual memory to the VM process 109a (e.g., using allocation component 111a)—while refraining from actually allocating physical memory (e.g., in system memory 103) to the VM process 109a—during the process' instantiation. Thus, based on this request, the allocation component 111a might allocate VM process 109a a memory space comprising virtual memory addresses—some (or all) of which might eventually be mapped to host-physical memory addresses (e.g., in system memory 103)—but the allocation component 111 but refrain from actually reserving any host-physical addresses or mapping any host-physical addresses to the virtual addresses during the allocation.

The memory manager 111 can store the assignment of these allocated virtual addresses to VM processes 109a within the page table(s) 103a stored in system memory 103. As is appreciated by those of ordinary skill in the art, a page table stores (among other things) mappings between virtual addresses and host-physical addresses. In general, page table(s) include a plurality of page table entries for each executing process, with each PTE for a process corresponding to a different virtual address in the process's virtual address space. The TLB 102a in the CPU(s) 102 stores mappings (i.e., between virtual addresses and HPAs) obtained from the page table(s) 103a based on recent activity by the CPU(s) 102.

The SLAT structure 102b in the CPU(s) 102 includes, for each child partition 107, a plurality of SLAT entries that map guest-physical memory addresses (i.e., addresses that the child partition views as making up its physical addresses space) to host-physical memory addresses that have been assigned by the memory manager 111 to a corresponding VM process 109. Notably, since during initialization of VM process 109a the memory manager 111 might allocate only virtual memory to the VM process 109a, without allocating physical memory, the SLAT structure 102b may not be filled with GPA-to-HPA mappings during initialization of the VM process 109a.

To understand the interactions between these different structures, FIGS. 2A-2C illustrate different examples 200a-200g of representations of page table entries (i.e., page tables 201a-201g), TLB entries (i.e., TLBs 202a-202g), and SLAT entries (i.e., SLATs 203a-203g) at different times during a corresponding virtual machine's lifetime. It is noted that page tables 201, TLB 202, and SLAT 203 illustrated in FIGS. 2A-2C show only structure and data sufficient to the understanding of the embodiments herein only and are not necessarily accurate representations of the actual structure of page tables, TLBs, and SLATs, or all of the data stored therein. As such, the embodiments herein are not limited to the structure and data illustrated and can, instead, be implemented within virtually all contemporary page table, TLB, and SLAT implementations.

Initially, to demonstrate the initialization of VM process 109a, FIG. 2A illustrates a first example 200a that shows representations of entries in a page table 201a (e.g., within page table(s) 103a), a TLB 201a (e.g., corresponding to TLB 102a), and a SLAT structure 203a (e.g., corresponding to SLAT 102b) following initialization of VM process 109a. As shown, during initialization of VM process 109a, entries in page table 201a that correspond to VM process 109a can be filled with the identities of virtual addresses that have been allocated to VM process 109a (shown symbolically as VA1-VA11, etc.). In some implementations, the entries in page table 201a lacks any host-physical address mappings, since, as discussed above, the virtualization stack 112 requested that the memory manager 111 allocate virtual memory to the VM process 109a without actually allocating physical memory to the VM process 109a. As shown, the TLB 202a and the SLAT 203a also lack any entries based on VM process 109a having been allocated its virtual memory space.

Once VM process 109a has been allocated a virtual address space, and after the child partition 107a is otherwise initialized using VM process 109a as a backing for its guest-physical address space, the child partition 107a can proceed to initialize an operating system kernel and, potentially, other operating system and/or application software (represented as process(es) 108a). In doing so, the child partition 107a executes processor instructions that make memory accesses using the child partition's guest-physical address space.

When a guest instruction executing at the CPU(s) 102 on behalf of the child partition 107a initially accesses a particular guest-physical memory address for the first time, the CPU(s) 102 walk entries in the SLAT 102b in an attempt to locate a corresponding host-physical memory address. Since the SLAT 102b initially lacks such an entry, the CPU(s) 102 pause the guest instruction, and generate an intercept (e.g., interrupt) to the hypervisor 105 which, in turn, routes the intercept to the host operating system (i.e., root partition 106). The host operating system has access to knowledge of which virtual address should map to the requested guest-physical address (e.g., based on a mappings structure 112a maintained by virtualization stack 112), and generates a page fault on this virtual address. The page fault on this subject virtual address is handled by the memory manager 111, which resolves the fault in substantially the same manner that conventional memory managers would for any other page fault (e.g., just like any page fault generated by a standard—i.e., non-VM—process).

In handling the page fault, the memory manager 111 identifies a free host-physical memory address (or takes it from another process) and allocates this host-physical memory address to the subject virtual address. The memory manager 111 stores this association in the appropriate PTE (i.e., in page table(s) 103a) for the subject virtual address. The CPU(s) 102, in turn, may store the association in a corresponding entry in the TLB 102a. Because the original intercept was caused by a SLAT miss, the CPU(s) 102 also store an association between the requested guest-physical memory address and the newly-allocated host-physical memory address in an entry in the SLAT 102b.

The CPU(s) 102 then re-start the guest instruction; this time, the CPU(s) 102 are able to locate the newly-allocated host-physical memory address when walking the SLAT 102b and can proceed to use the host-physical memory address as needed by the guest instruction. So long as this entry in the SLAT 102b remains valid, subsequent accesses from the child partition 107a to this guest-physical address can be directly translated to the host-physical memory address from SLAT 102b, without any intercepts to the host.

FIG. 2B illustrates a second example 200b that shows representations of entries in a page table 201b, a TLB 201b, and a SLAT 203a following handling of an intercept, as described above, on a guest-physical address that is represented symbolically as GPA2. In example 200b, the allocated host-physical address is represented symbolically as HPA2, and it is shown in page table 201b as being associated by memory manager 111 with a virtual address represented symbolically as VA2. The PTE for virtual address VA2 in page table 201b also includes an "accessed" field (e.g., a flag, such as a single bit), which has been set (e.g., to a 1) in order to indicate that VA2 (and, by extension, host-physical address HPA2) has been accessed by VM process 109a. In implementations, the accessed bit could be set in the PTE by memory manager 111 when it fills the host-physical address mapping, or it could be set later by the CPU(s) 102 when the virtual address is actually accessed by the child partition 107a or when the virtual address is speculatively fetched by the TLB 102a. As indicated by arrow 204, based on this assignment, the CPU(s) 102 may fill the TLB 202b with a corresponding entry, and also fill the SLAT 203b with an entry mapping GPA2 with HPA2 (with an accessed flag set). Filling the entry in the TLB 202b could be optional, since the host didn't actually access the virtual address. So long as this entry in the SLAT 203b remains valid, subsequent accesses from the child partition 107a to GPA2 can be directly translated to the HPA2 from SLAT 203b, without any intercepts to the host.

The foregoing memory intercept process can repeat each time the child partition 107a accesses a new guest-physical address for the first time. For example, FIG. 2C illustrates a third example 200c that shows representations of entries in a page table 201c, TLB 202c, and SLAT 203c following handling of memory intercepts for three guest-physical addresses, represented symbolically as GPA1-GPA3. As shown, these GPAs are mapped to host-physical addresses HPA1-HPA3 in SLAT 201c. These HPAs are, in turn, mapped to virtual addressees VA1-VA2 in page table 201c, and depending on implementation and CPU activity they may also be in the TLB 202c. So long as these entries in the SLAT 203c remain valid, subsequent accesses from the child partition 107a to any of guest-physical addresses GPA1-GPA3 can be directly translated to the appropriate host-physical addresses (i.e., one of HPA1-HPA3) from SLAT 203c, without any memory intercept to the host.

As shown in FIG. 1, the memory manager 111 can include trimming 111b and aging 111c components, which the memory manager 111 can use to reassign memory pages (i.e., referenced based on host-physical address) from one virtual address to another (e.g., from a first virtual address in one process to a second virtual address in another process). As introduced in the Background, conventional memory managers can also age and trim memory pages, but they do so in a manner that causes SLAT entries to be invalidated.

Figure 3:
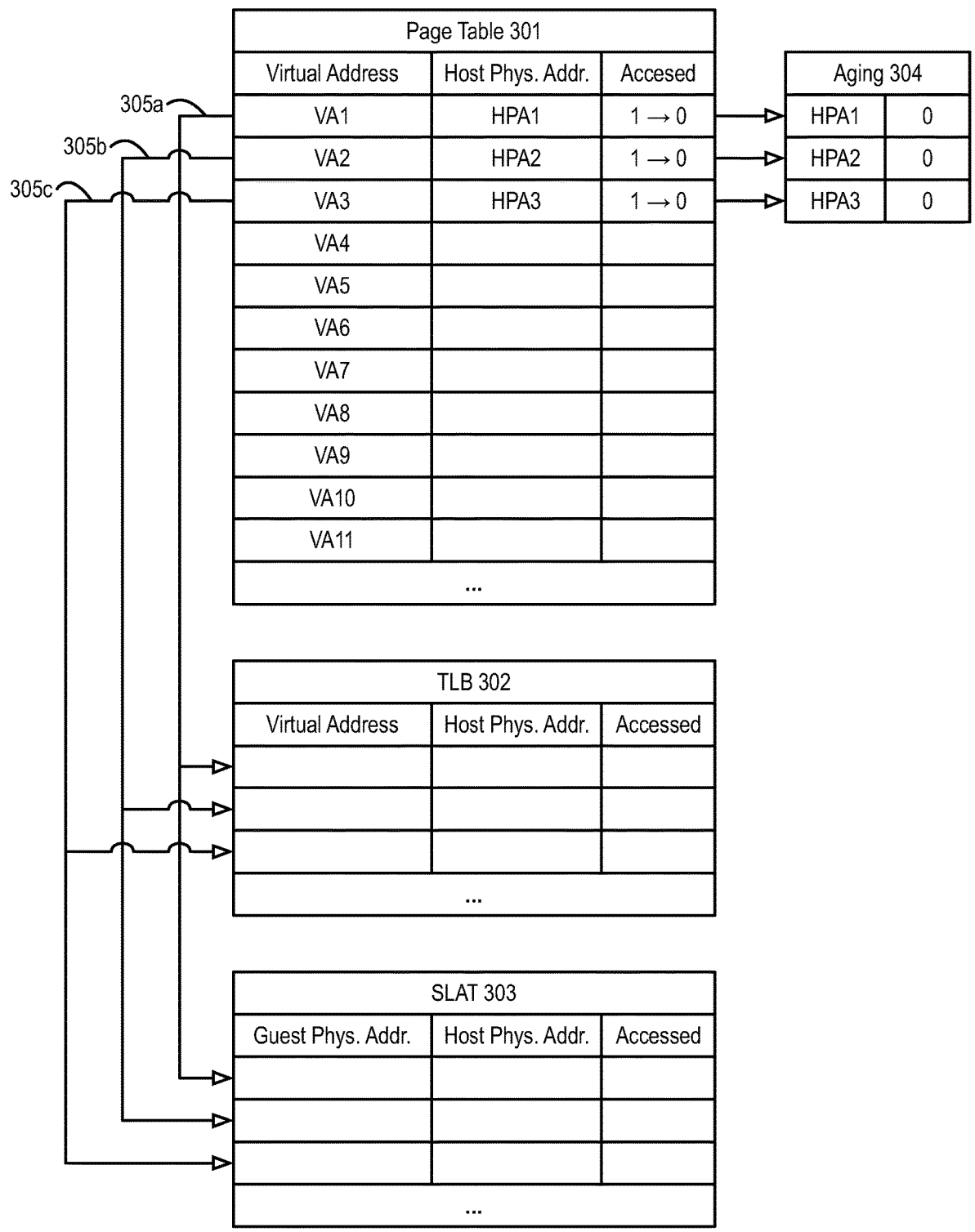
FIG. 3 illustrates an example of entries a TLB and a SLAT would be adversely affected if a conventional memory manager is used to track the ages of host-physical memory addresses.

In order to further understand the inefficiencies caused by conventional memory managers invalidating SLAT entries in VA-backed VM environments, FIG. 3 shows how the entries in SLAT 203c (discussed in connection with FIG.

2C) would be adversely affected if a conventional memory manager were to be used in environment 100 in order to track the ages of memory addresses assigned to VM process 109a.

In particular, FIG. 3 illustrates an example 300a that shows representations of entries in a page table 301 (e.g., corresponding page table 201c), a TLB 302 (e.g., corresponding to TLB 201c), and a SLAT 303 (e.g., corresponding to SLAT 203c) following operation of a conventional aging methodology by a conventional memory manager. FIG. 3 also includes a new table showing aging information 304 that might result from a conventional memory manager carrying out a conventional aging methodology. While aging information 304 represents the ages of host-physical memory addresses (e.g., HPA1-HPA3), implementations could represent the ages of corresponding virtual memory addresses (e.g., VA1-VA3) instead.

In general, conventional memory managers periodically walk through a working set of active page table entries for a process (e.g., entries that have valid virtual to host-physical memory address mappings) and use the accessed flags in each of these PTEs to determine if the PTE's corresponding host-physical memory address has been accessed since the last time the working set was traversed. The conventional memory manager would then use existing values of the accessed flags to update aging information, and clear any accessed flags (e.g., to a 0) that were set (e.g., to a 1). The next time the CPU does a memory translation based on the PTE, the CPU will again set the accessed flag.

Thus, for example, as shown in page table 301, a conventional memory manager operating on page table 201c would clear each of the accessed flags for the PTEs corresponding to HPA1-HPA3. As shown in aging information 304, because host-physical addresses HPA1-HPA3 had been accessed since the last aging pass, their aging information (or aging information for VA1-VA3) might be set (or reset) to some value (e.g., 0) to indicate that the corresponding memory pages have been recently accessed. If the accessed flag is set on a subsequent aging pass, the aging information for that host-physical or virtual address can again be reset; if not, the aging information for that host-physical or virtual address can be incremented.

As indicated by arrows 305a-305c, the act of the conventional memory manager clearing these accessed flags results in the CPU flushing or invalidating the corresponding entries in the TLB 302 and the SLAT 303. Assuming, for a moment, that the memory manager 111 had performed aging in this conventional manner, this would mean that the next time the child partition 107a accesses one of these guest-physical addresses (i.e., GPA1-GPA3), the CPU(s) 102 would fail to locate the appropriate host-physical address in the SLAT 102b, and would thus need to again initiate a memory intercept to the hypervisor—which would in turn trap to the host so that the memory manager 111 could processes a page fault. These context switches are extremely expensive (i.e., computationally) and could severely affect performance of software executing in both the root partition 106 and the child partition 107a.

In order to overcome these significant adverse consequences resulting from the mere act of tracking aging information for a process backing a VA-backed virtual machine, the embodiments herein provide an "enlightened" memory manager 111 that avoids SLAT invalidations during the maintenance of aging information. In particular, unlike a conventional memory manager, memory manager 111 is enlightened to be aware of the SLAT 102b, the virtualization stack 112, and that VM processes 109 back VA-backed virtual machines. This enlightenment is indicated by arrow 115a between aging component 111c and mappings 112a, arrow 115b between aging component 111c and SLAT 102b.

When the aging component 111c of this enlightened memory manager 111 walks through a working set of active page table entries for VM process 109a, it determines whether the virtual addresses referenced in those PTEs correspond to a VM process that backs a memory space for a VA-backed virtual machine. Aging component 111c could make such an identification based on different types of metadata, such thread/processes bookkeeping information stored by the kernel 110, or metadata stored in the page table(s) 103a (e.g., in each PTE, as part of metadata relevant to a page table generally, as part of metadata about the VM process 109a, etc.).

Aging component 111c could also make such an identification based on mappings 112a stored by the virtualization stack 112 (e.g., as indicated by arrow 115a). In embodiments, mappings 112a could include mappings between virtual addresses and guest-physical memory addresses. As such, when aging component 111c encounters a given virtual address when walking PTEs for aging information, it could consult the mappings 112a to determine if there is a corresponding guest-physical address mapping. If so, the aging component 111c can determine that the virtual address (and, thus, the corresponding host-physical address) of the PTE corresponds to a process that backs a VA-backed virtual machine.

When considering a PTE that does correspond to a VM process that backs a VA-backed virtual machine, the aging component 111c can use accessed flags in the SLAT 102b, rather than in the page table(s) 103a, to maintain aging information (e.g., as indicated by arrow 115b). Thus, for example, when considering a PTE that corresponds to a VA-backed VM, the aging component 111c can identify a corresponding entry in the SLAT 102b (e.g., via communications with the virtualization stack/hypervisor 105). The aging component 111c might identify the corresponding SLAT entry based on the host-physical address obtained from the PTE or based on a guest-physical address obtained from the mappings 112a. Once the appropriate SLAT entry is identified, the aging component 111c can cause the hypervisor 105 to query—and then clear—an accessed flag in that SLAT entry, rather than using an entry in the page table(s) 103a. The aging component 111c can then to determine if the PTE's corresponding host-physical memory address (or virtual memory address) has been accessed since the last time the working set was traversed based on the value of the accessed flag that was queried from the SLAT entry, and update aging information for the host-physical memory address (or virtual memory address) accordingly. In this way, the accessed flags in the page table(s) 103a remain unmodified while updating aging information, resulting in there being no aging-initiated invalidations in the SLAT 102b.

FIGS. 4A-4D demonstrate this new aging process. Each of these Figures includes an example page table (i.e., 401a-401d) comprising virtual addresses that back guest-physical memory, an example TLB (i.e., 402a-402d) comprising virtual addresses that back guest-physical memory, and an example SLAT (i.e., 403a-403d), as in prior Figures. FIGS. 4A-4D also include aging information (i.e., 404a-404d) and mappings (i.e., 405a-405d)—such as mappings that might be represented in mappings 112a of FIG. 1. Similar to FIG. 3, aging information 404a-404d represents the ages of host-physical memory addresses (e.g., HPA1-HPA3). However, implementations could represent the ages of corresponding virtual memory addresses (e.g., VA1-VA3) instead.

Figure 4A:
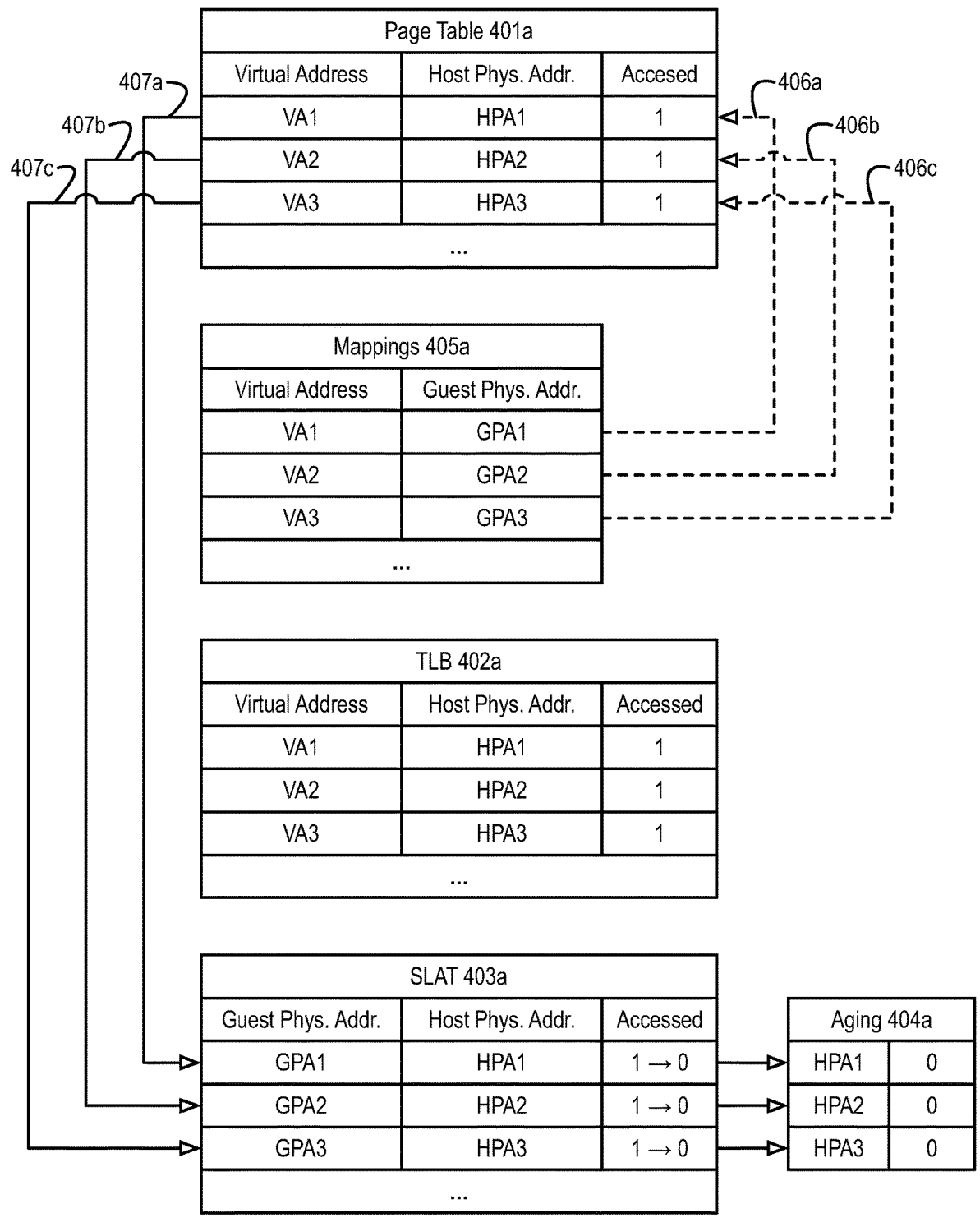
FIG. 4A illustrates an example of updating aging information using an "enlightened" memory manager.

Initially, FIG. 4A illustrates an example 400a of updating aging information using an "enlightened" memory manager, such as memory manager 111. In particular, FIG. 4A shows representations of entries in a page table 401a, a TLB 402a, and a SLAT 403a following operation of an improved aging methodology by memory manager 111 on the page table 201c, the TLB 201c, and the SLAT 203c of FIG. 2C.

As shown in FIG. 4A, as the aging component 111c walks though the working set of active PTEs for VM process 109a in page table 401a, the aging component 111c identifies (e.g., via the virtualization stack 112/hypervisor 105) an entry in the SLAT 403a that corresponds to each PTE. Arrows 407a conceptually represent the identification of SLAT entries from page table entries. For each of these SLAT entries, the aging component 111c causes the hypervisor 105 to query a current value of the entry's accessed flag, and then the flag—as shown in the Accessed column of SLAT 403a. The aging component 111c then uses the queried accessed flag values to update aging information for the appropriate host-physical addresses. As shown, since the accessed flag was set in each of these SLAT entries, the aging information 404a can be set (or reset) to some value (e.g., 0) to indicate that the corresponding host-physical or virtual memory pages have been recently accessed.

Comparing FIG. 4A and FIG. 3, the aging information 404a resulting from this new aging process is equivalent to the aging information 304 resulting from conventional aging process. However, unlike the entries in the SLAT 303 of FIG. 3 (i.e., which have been flushed/invalidated due to the convention aging process), the entries in the SLAT 403a have remained present and valid. As such, any subsequent memory accesses by the child partition 107a to guest-physical addresses GPA1-GPA2 can be handled entirely by the SLAT 403a, rather than causing a memory intercept to the hypervisor and the host. Thus, unlike conventional aging processes, the new aging process is non-destructive to valuable mapping information that is unique to VA-backed virtual machines, and that greatly improves system performance when present.

FIG. 4A also shows that the new aging process might also leverage mappings 405a, which map virtual addresses (i.e., VA1-VA3) of VM process 109a to associated guest-physical addresses (i.e., GPA1-GPA3). Arrows 406a-406c conceptually represent obtaining a GPA for a given virtual address from mappings 405a. These mappings 405a might be useful to aging component 111c for a couple of different purposes. Initially, during its walk of the PTE's of page table 401a, the aging component 111c might consult the mappings 405a to determine if a given virtual address (i.e. VA1-VA3) has been assigned a corresponding guest-physical address (i.e., GPA1-GPA3). If an assignment is present in mappings 405a, the aging component 111c might use this information to determine that a given PTE corresponds to a virtual address that backs a VA-backed VM, and that the new aging processes (i.e., leveraging the SLAT 403a) should be used for this virtual address.

Additionally, or alternatively, the aging component 111c might use information in mappings 405a to help identify the proper entry in SLAT 403a. For example, while the aging component 111c might be able to identify the appropriate SLAT entry based on host-physical address, it might be more efficient to locate it based on guest-physical address (e.g., since the SLAT 403a might be indexed based on guest-physical address).

FIG. 4B shows an example 400b of a page table 401b, a TLB 402b, a SLAT 403b, aging information 404b, and mappings 405b after a second aging pass of an "enlightened" memory manager. Example 400c assumes that, prior to this second aging pass, the child partition 107a has accessed its guest-physical address GPA1 at least once. Thus, based on this access, the entry for that address in SLAT 403b had its accessed flag set prior to the second aging pass. Since the entries for virtual addresses VA1-VA3 are valid in the page table 401b, during the second aging pass, the aging component 111c reads the values of the accessed flags in each of the corresponding entries in SLAT 403b, and then clears any of those flags that were set (in this case, the flag for GPA1, as shown). The aging component 111c then updates aging information 404b based on the values read. As shown, the age for host-physical address HPA1 (or virtual address VA1) is reset (i.e., due to the accessed flag for the SLAT entry corresponding to GPA1 having been set), and the age for host-physical addresses HPA2 and HPA3 (or virtual addresses VA1 and VA2) are incremented (i.e., due to the accessed flag for the SLAT entries corresponding to GPA2 and GPA3 having been cleared). Again, all of the relevant entries in SLAT 403b have remained present and valid.

FIG. 4C shows an example 400c of a page table 401c, a TLB 402c, a SLAT 403c, aging information 404c, and mappings 405c after a third aging pass of an "enlightened" memory manager. Example 400c assumes that, prior to this third aging pass, the child partition 107a accessed its guest-physical addresses GPA1 and GPA2, at least once each. Thus, based on these accesses, the entries for those addresses in SLAT 403c had their accessed flags set prior to the second aging pass. Since the entries for virtual addresses VA1-VA3 are valid in the page table 401c, during the third aging pass, the aging component 111c reads the values of the accessed flags in each of the corresponding entries in SLAT 403c, and then clears any of those flags that were set (in this case, the flags for GPA1 and GPA2, as shown). The aging component 111c then updates aging information 404c based on the values read. As shown, the ages for host-physical addresses HPA1 and HPA2 (or virtual address VA1 and VA2) are reset (i.e., due to the accessed flags for the SLAT entries corresponding to GPA1 and GPA2 having been set), and the age for host-physical address HPA3 (or virtual address VA3) is again incremented (i.e., due to the accessed flag for the SLAT entries corresponding to GPA3 having been cleared). Again, all of the relevant entries in SLAT 403c have remained present and valid.

FIG. 4D shows an example 400d of a page table 401d, a TLB 402d, a SLAT 403d, aging information 404d, and mappings 405d after a fourth aging pass of an "enlightened" memory manager. Example 400d assumes that, prior to this third aging pass, the entry for VA3 in page table 401d had its entry invalidated. This could be the case, for example, due to trimming component 110b having trimmed host-physical address HPA3 from process 109a so that it could be given to another processes. Since the HPA3 was trimmed from process 109a, its contents would typically be paged to secondary storage, such as durable storage 104 to that they can be retrieved alter. This is symbolically represented in page table 401d as host-physical address "PAGED OUT." Trimming component 110b might have chosen host-physical address HPA3 for trimming since it had the oldest age between HPA1-HPA3 (i.e., a value of 2 for HPA3 versus 0 for HPA1 and HPA2). As shown, based on the entry for VA3 in page table 401d having been invalidated, the CPU(s) 102 flush or invalidate the corresponding entries in the TLB 402d and the SLAT 403*d*. As shown, the aging component 110*c* might also remove or invalidate a corresponding entry in aging information 404*d*.

During this fourth aging pass, the aging component 111*c* walks over the PTE corresponding to VA1 and VA2 but skips VA3 since it is no longer in the process' working set. The aging component 111*c* therefore reads the values of the accessed flags in the entries in SLAT 403*d* corresponding to GPA1 and GPA2. Since neither was set, neither is cleared. The aging component 111*c* updates aging information 404*d* based on the values read, this time incrementing the age of HPA1 and HPA2 (or virtual addresses VA1 and VA2). While the SLAT entry for GPA2 was invalidated due to the trimming event, again no entries in the SLAT 403*c* were invalidated to due tracking aging information.

It is noted that some CPUs are designed to automatically set the appropriate accessed flag in a SLAT as part of handling a translation and/or as part of importing a new mapping into the SLAT. However, there are some CPUs which do not do this automatically. The enlightened memory manager 111 herein is still able to operate, even in these environments. In particular, these CPUs can be configured (e.g., by the hypervisor 105) such that, when they encounter a cleared accessed flag in a SLAT, the CPU traps back to the hypervisor 105. The hypervisor, then registers a fault (e.g., an access bit fault) and sets the flag in the SLAT. While setting accessed flags becomes slightly less performant in these scenarios, all the benefits of avoiding SLAT invalidations while updating aging information remain—greatly counteracting the slight performance degradation of setting accessed flags.

It is also noted that, in some implementations, a VM process 109 might be a "mixed" process. A mixed process could, for example, use some virtual addresses to back virtual machine memory, while also using other virtual addresses for some other purpose (e.g., to store operational metadata for the corresponding virtual machine). Additionally, or alternatively, a mixed VM process could be backed in part by host-physical addresses (i.e., like a "physical" virtual machine) and in part by virtual addresses (e.g., like a VA-backup virtual machine). Additionally, or alternatively, a VM process could be used to host multiple virtual machines.

The enlightened memory manager 111 herein is operable with any of these mixed scenarios, and/or any combination of these mixed scenarios. For example, as demonstrated above, the aging component 111*c* can determine, for each PTE, whether the corresponding virtual address backs a virtual machine or not. This could be done by using metadata stored in the page table(s) 103*a*, or using mappings 112*a*, for example. As such, the aging component 111*c* can distinguish which virtual addresses in a mixed VM process back virtual machine memory, and which ones do not. The aging component 111*c* can then use the improved aging methodologies (i.e., leveraging the SLAT) when it encounters PTEs for the process backing virtual machine memory, and use conventional aging methodologies when it encounters PTEs for the process that are used for some other purpose.

It is noted that the embodiments herein can operate in a wide variety of memory usage scenarios. For example, it may be possible that the host, rather than a virtual machine, accesses a virtual address that backs a virtual machine (i.e., the host reads the RAM of a guest). In these situations, the host's access to a virtual address can cause the age count for the corresponding host-physical or virtual address to be incremented (e.g., due to an accessed flag being set in a VM process' PTE or in a SLAT entry when the host accesses the virtual address).

In another example, it may be possible to direct-map shared memory (e.g., files) into the virtual memory space of a VM process. Thus, for example, physical memory corresponding to a shared library loaded within root partition 106 can be mapped into the virtual address space for one or more child partitions 107*a*. In these situations, a guest's accesses to these physical memory pages can be tracked so that aging information for physical memory backing these direct-mapped files can also be tracked. In implementations, this shared memory might be aged and trimmed separately for each child partition. For example, when direct-mapping shared memory into multiple virtual machines, each VM's backing process can have its own virtual address for the mapping of the shared memory. Then, aging information is maintained per virtual address (e.g., as opposed to per host-physical address) so that the trimming component 111*b* can trim the page from individual working sets independently. So, for example, if child partition 107*a* is using a direct-mapped shared library frequently, and child partition 107*b* is not using the shared library as much, the trimming component 111*b* might trim the virtual address for VM process 109*b* (i.e., corresponding to child partition 107*b*) but not for VM process 109*a* (i.e., corresponding to child partition 107*a*).

Figure 5:
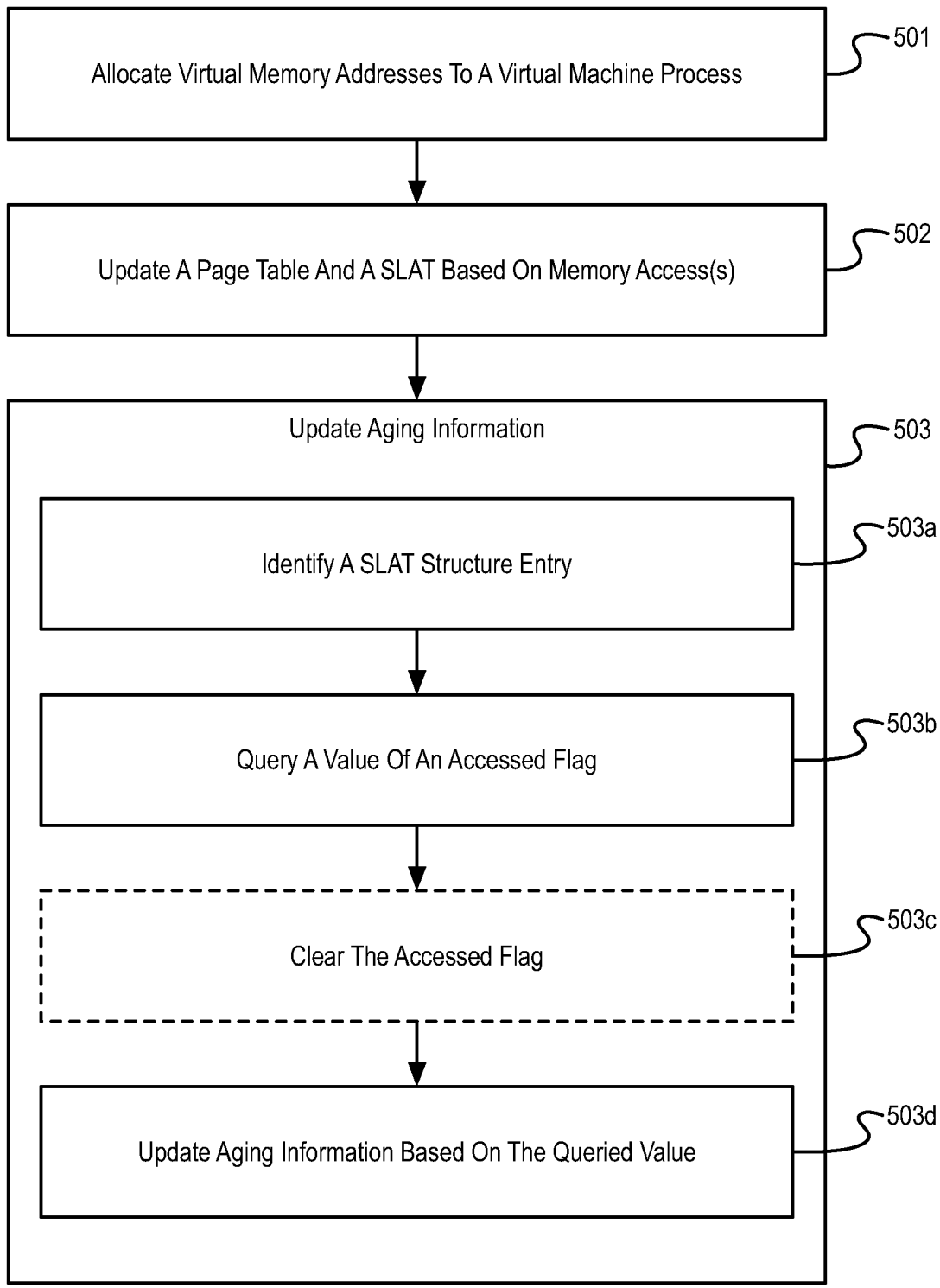
FIG. 5 illustrates a flowchart of an example method for using accessed flags in a SLAT structure to update aging information for a host-physical memory address used by a virtual address-backed virtual machine in a manner that retains validity of SLAT structure entries.

In view of the foregoing, FIG. 5 illustrates a flowchart of an example method 500 for using accessed flags in a SLAT structure to update aging information for a host-physical memory address used by a virtual address-backed virtual machine in a manner that retains validity of SLAT structure entries. FIG. 5 is described in connection with the example virtualization environment 100 of FIG. 1, and the examples of FIGS. 2A-2C and 4A-4D.

As a preliminary matter, as was discussed, a SLAT is typically a processor-based feature. Thus, in method 500 one or more processors used could comprise the SLAT structure. Since different processor manufacturers have different SLAT implementations, the particular structure of the SLAT could vary. For example, the SLAT structure could implement INTEL's EPT, AMD's RVI, or the like.

As shown, method 500 includes an act 501 of allocating virtual memory addresses to a virtual machine process. In some embodiments, act 501 comprises allocating a virtual memory address to a process backing a virtual machine, the virtual address allocated within a page table entry of a page table. For example, as discussed in connection with FIG. 1, a host can instantiate a VM process 109*a* for backing the memory of child partition 107*a*. In doing so, the host memory manager 111 can allocate, within a plurality of page table entries in page table(s) 103*a*, a plurality of virtual memory addresses (including the subject virtual address) for the VM process 109*a*.

However, since this is a VA-backed virtual machine, the host memory manager 111 can refrain from actually allocating host-physical memory addresses to those virtual addresses. Thus, as shown in FIG. 2A, page table 201*a* might include virtual address allocations (e.g., VA1-VA11, etc.), but might lack any mappings to host-physical addresses. In addition, the TLB 202*a* and SLAT 203*a* are not filled with any host-physical address mappings based on this instantiation. As will be appreciated by one of ordinary skill in the art, virtual addresses typically reference a virtual memory page, and host-physical addresses typically reference a physical memory page.

Method 500 also includes an act 502 of updating a page table and a SLAT based on memory access(s). In some embodiments, act 502 comprises based on one or more memory accesses by the virtual machine to a non-mapped guest-physical memory address, (i) identifying that the non-mapped guest-physical memory address is associated with the allocated virtual address, (ii) allocating a host-physical memory address for the accessed guest-physical address, (iii) within the page table entry, associating a host-physical address with the virtual address; (iv) within a SLAT structure entry, associating the guest-physical address with the host-physical address; and (v) setting the an accessed flag within the SLAT structure entry.

For example, based on child partition 107a executing an instruction accessing a non-mapped guest-physical address (e.g., GPA2), the allocation component 111a can identify (e.g., using mappings 112a) that the guest-physical address (e.g., GPA2) is associated with the virtual memory address (e.g., VA2) that was allocated in act 501. The memory manager 11 can also allocate a host-physical address in system memory 103 (e.g., HPA2) for this guest-physical address. Then, as shown in page table 201b of FIG. 2B, the allocation component 111a can store a mapping between the virtual address and the host-physical address in a page table entry in page table 201b. Optionally, the allocation component 111a might set the accessed flag in this entry. In addition, the CPU(s) 102 may fill a corresponding entry in TLB 201b. The CPU(s) 102 can also fill a corresponding entry in SLAT 203b with a mapping between GPA2 and HPA2. An accessed flag can also be set within that SLAT entry. This accessed flag in the SLAT entry could be set by the CPU(s) 102 as part of the CPU(s) 102 filling the SLAT entry, or it could be set based on a trap to the hypervisor 105. As shown in FIG. 2C, this process can be repeated for each new memory access to a guest-physical address.

Method 500 also includes an act 503 of updating aging information. In some embodiments, act 503 comprises updating aging information for at least one of the virtual address or the host-physical address. As shown, act 503 can include a plurality of sub-acts. As shown, for instance, act 503 includes an act 503a of identifying a SLAT structure entry. In some embodiments, act 503a comprises, based at least on accessing the page table entry while walking a working set of page table entries for the process, identifying the SLAT structure entry. For example, as shown in connection with FIG. 4A, an enlightened memory manager 111 can use an aging component 111c to walk a working set of page table entries in page table 401a (e.g., corresponding VA-VA3). As shown by arrows 407a-407c, the aging component 111c (being enlightened to the notion of VA-backed virtual machines) can identify that these page table entries back VM process 109a corresponding to child partition 107a and communicate with the virtualization stack 112/hypervisor 105 to identify corresponding entries in SLAT 403a. For virtual address VA2, this could mean identifying the SLAT 403a entry corresponding to GPA2.

As discussed, the aging component 111c can identify that a given page table entry corresponds to virtual machine memory based on metadata (e.g., in pages table(s) 103a), or from other mappings 405a, such as mappings 112a. Thus, when using mappings 405a, identifying the SLAT structure entry could comprise consulting virtualization stack mappings to identify the guest-physical address from the virtual address, as demonstrated by arrows 406a-406c.

Act 503 also includes an act 503b of querying a value of an accessed flag. In some embodiments, act 503b comprises querying a value of the accessed flag in the SLAT structure entry. For example, based on having identified a corresponding entry for VA2 in SLAT 403a (i.e., the entry corresponding to GPA2), the aging component 111c can communicate with the virtualization stack 112/hypervisor 105 to query the value of that entry's accessed flag, which is set in SLAT 403a.

Act 503 also includes an act 503c of clearing the accessed flag. In some embodiments, act 503c comprises clearing the accessed flag in the SLAT structure entry without invalidating the SLAT structure entry. For example, the aging component 111c can communicate with the virtualization stack 112/hypervisor 105 to instruct the CPU(s) 102 to clear the appropriate entry in SLAT 102b. As shown in FIG. 4A, this could be accomplished by changing the value of the flag from 1 to 0, though this could be accomplished in other ways, depending on implementation. Notably, in FIG. 5, act 503c is shown in broken lines. This is because, if the value queried in act 503b was already cleared (e.g., 0), some implementations may not actually carry out a clearing operation.

Act 503 also includes an act 503d of updating aging information based on the queried value. In some embodiments, act 503d comprises updating aging information for the at least one of the virtual address or the host-physical address based on the queried value of the accessed flag. For example, the aging component 111c can use the value queried in act 503b to update aging information 404a for HPA2. As show in FIG. 4A, this means setting or resetting the aging information for HPA 2 (e.g., to 0), since HPA2 was flagged as being accessed since the last aging pass. While aging information 404a tracks ages in terms of host-physical memory addresses, it could additionally, or alternatively, tracks ages in terms of virtual memory addresses.

As was discussed in connection with FIGS. 4B-4D, the aging component 111c can make additional aging passes at later times. Depending on whether guest-physical address GPA2 was accessed between passes, the value of the accessed flag in the SLAT entry for GPA2 can vary. Thus, updating aging information based on the queried value of the accessed flag could include one of: incrementing an age of at least one of the virtual address or the host-physical address when the accessed flag is cleared (e.g., as shown in FIGS. 4B and 4D), or resetting the age of at least one of the virtual address or the host-physical address when the accessed flag is set (e.g., as shown in FIGS. 4A and 4C).

As was discussed, by using the SLAT for the aging process described herein, the SLAT 403 retains valid GPA-to-HPA mappings after each aging process, unlike prior aging methods. Thus, for example, if the memory access by the virtual machine to the guest-physical address in act 502 is a first memory access, then method 500 could also include, after clearing the accessed flag in the SLAT structure entry without invalidating the SLAT structure entry (i.e., act 503c), identifying a second memory access by the virtual machine to the guest-physical address. This time, the CPU(s) 102 can provide the host-physical address to the virtual machine from the SLAT structure entry, without invoking a host memory manager, as would be necessary when using prior aging methods.

As was described above and alluded to in the discussion of act 502, some CPUs may not be able to set accessed flags in a SLAT automatically. When method 500 is operated in these environments, setting the accessed flag within the SLAT structure entry might comprise trapping to a hypervisor to set the accessed flag.

In addition, method 500 might be operated in environments in which the VM process 109a is a mixed process. In these environments, the process backing the virtual machine could include (i) a first virtual address backing virtual machine memory and (ii) a second virtual address backing non-virtual machine memory. If the memory access by the virtual machine in act 502 to guest-physical address is a first memory access, then method 500 could include, based on determining that a second memory access to the first virtual address is to virtual machine memory, consulting the SLAT structure to obtain a corresponding host-physical address without consulting the page table. Method 500 could also include, based on determining that a third memory access to the second virtual address is to non-virtual machine memory, consulting the page table to obtain a corresponding host-physical address. Thus, method 500 can use the SLAT for aging the memory backing virtual machine memory and use a page table for aging the memory backing non-virtual machine memory.

In addition, method 500 might be operated in environments in which the host direct-maps files to memory. In these environments, associating the guest-physical address with the host-physical address could comprise associating the guest-physical address with a host-physical address corresponding to a direct-mapped file. In these situations, virtual addresses associated with the direct-mapped file could be trimmed separately for different virtual machines.

Accordingly, embodiments described herein improve the efficiencies of tracking aging information for physical memory pages that are assigned to VA-backed virtual machines. Rather than managing aging information for memory addresses backing virtual machines using accessed flags in a page table, an enlightened memory manager manages aging information for these addresses using accessed flags in a SLAT. Doing so provides a significant advancement to the technological field of virtualization, and particularly virtualization that provides VA-backed virtual machines. In particular, the enlightened memory manager enables a host system to track aging information for physical memory that is allocated to virtual machines, without having this mere act of bookkeeping destroy otherwise valid SLAT information that could have been used later to immensely improve the performance of memory accesses by these virtual machines. This greatly decreases the computational consequences that tracking aging information imposes on both VA-backed virtual machines and hosts alike, making aging and trimming of memory backing VA-backed virtual machines much more practical and efficient then present techniques.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for using accessed flags in a second level address translation (SLAT) structure to update aging information for a host-physical memory address (HPA) used by a virtual address-backed virtual machine in a manner that retains validity of SLAT structure entries, the method comprising:
   allocating a virtual memory address (VA) to a process backing a virtual machine, the VA allocated within a page table entry (PTE) of a page table;
   based on one or more memory accesses by the virtual machine to a non-mapped guest-physical memory address (GPA),
      identifying that the non-mapped GPA is associated with the allocated VA;
      allocating an HPA for the accessed GPA;
      within the PTE, associating the HPA with the VA;
      within a SLAT structure entry, associating the GPA with the HPA; and
      setting an accessed flag within the SLAT structure entry; and
   updating aging information, including:
      based at least on accessing the PTE while walking a working set of PTEs for the process, identifying the SLAT structure entry;
      querying a value of the accessed flag in the SLAT structure entry;
      clearing the accessed flag in the SLAT structure entry without invalidating the SLAT structure entry; and
      updating aging information for at least one of the VA or the HPA based on the queried value of the accessed flag.

2. The method of claim 1, wherein the one or more processors comprise the SLAT structure.

3. The method of claim 2, wherein the SLAT structure implements one of Extended Page Table (EPT) or Rapid Virtualization Indexing (RVI).

4. The method of claim 1, wherein update aging information based on the queried value of the accessed flag includes one of:
   incrementing an age of at least one of the VA or the HPA when the accessed flag is cleared; or
   resetting the age of at least one of the VA or the HPA when the accessed flag is set.

5. The method of claim 1, wherein identifying the SLAT structure entry comprises consulting virtualization stack mappings to identify the GPA from the VA.

6. The method of claim 1, the method further comprising:
   after clearing the accessed flag in the SLAT structure entry without invalidating the SLAT structure entry, identifying a subsequent memory access by the virtual machine to the GPA; and
   providing the HPA to the virtual machine from the SLAT structure entry, without invoking a host memory manager.

7. The method of claim 1, wherein setting the accessed flag within the SLAT structure entry comprises trapping to a hypervisor to set the accessed flag.

8. The method of claim 1, wherein the one or more memory accesses by the virtual machine to the GPA comprise one or more first memory accesses, wherein the process backing the virtual machine includes (i) a first VA backing virtual machine memory and (ii) a second VA backing non-virtual machine memory, and wherein the method further comprises:
   based on determining that a second memory access to the first VA is to virtual machine memory, consulting the SLAT structure to obtain a corresponding HPA without consulting the page table; and
   based on determining that a third memory access to the second VA is to non-virtual machine memory, consulting the page table to obtain a corresponding HPA.

9. The method of claim 1, wherein associating the GPA with the HPA comprises associating the GPA with an HPA corresponding to a direct-mapped file.

10. The method of claim 9, wherein virtual addresses associated with the direct-mapped file are trimmed separately for different virtual machines.

11. A computer system, comprising:
one or more processors that include a second level address translation (SLAT) structure; and
one or more computer-readable media having stored thereon computer-executable instructions that are executable by the one or more processors to use accessed flags in the SLAT structure to update aging information for a host-physical memory address (HPA) used by a virtual address-backed virtual machine in a manner that retains validity of SLAT structure entries, the computer-executable instructions including instructions that are executable to cause the computer system to perform at least the following:
allocate a virtual memory address (VA) to a process backing a virtual machine, the VA allocated within a page table entry (PTE) of a page table;
based on one or more memory accesses by the virtual machine to a non-mapped guest-physical memory address (GPA),
identify that the non-mapped GPA is associated with the allocated VA;
allocate an HPA for the accessed GPA;
within the PTE, associate the HPA with the VA;
within a SLAT structure entry, associate the GPA with the HPA; and
set an accessed flag within the SLAT structure entry; and
update aging information, including:
based at least on accessing the PTE while walking a working set of PTEs for the process, identify the SLAT structure entry;
query a value of the accessed flag in the SLAT structure entry;
clear the accessed flag in the SLAT structure entry without invalidating the SLAT structure entry; and
update aging information for at least one of the VA or the HPA based on the queried value of the accessed flag.

12. The computer system as recited in claim 11, wherein the SLAT structure implements one of Extended Page Table (EPT) or Rapid Virtualization Indexing (RVI).

13. The computer system as recited in claim 11, wherein updating aging information based on the queried value of the accessed flag includes one of:
incrementing an age of at least one of the VA or the HPA when the accessed flag is cleared; or
resetting the age of at least one of the VA or the HPA when the accessed flag is set.

14. The computer system as recited in claim 11, wherein identifying the SLAT structure entry comprises consulting virtualization stack mappings to identify the GPA from the VA.

15. The computer system as recited in claim 11, wherein the computer-executable instructions also include instructions that are executable to cause the computer system to:
after clearing the accessed flag in the SLAT structure entry without invalidating the SLAT structure entry, identify a subsequent memory access by the VM to the GPA; and
provide the HPA to the virtual machine from the SLAT structure entry, without invoking a host memory manager.

16. The computer system as recited in claim 11, wherein setting the accessed flag within the SLAT structure entry comprises trapping to a hypervisor to set the accessed flag.

17. The computer system as recited in claim 11, wherein the one or more memory accesses by the virtual machine to the GPA comprise one or more first memory accesses, wherein the process backing the virtual machine includes (i) a first VA backing virtual machine memory and (ii) a second VA backing non-virtual machine memory, and wherein the computer-executable instructions also include instructions that are executable to cause the computer system to:
based on determining that a second memory access to the first VA is to virtual machine memory, consult the SLAT structure to obtain a corresponding HPA without consulting the page table; and
based on determining that a third memory access to the second VA is to non-virtual machine memory, consult the page table to obtain a corresponding HPA.

18. The computer system as recited in claim 11, wherein associating the GPA with the HPA comprises associating the GPA with an HPA corresponding to a direct-mapped file.

19. The computer system as recited in claim 11, wherein the VA references a virtual memory page, and the HPA references a physical memory page.

20. A computer program product comprising one or more hardware storage devices having stored thereon computer-executable instructions that are executable by one or more processors to use accessed flags in a second level address translation (SLAT) structure to update aging information for a host-physical memory address (HPA) used by a virtual address-backed virtual machine in a manner that retains validity of SLAT structure entries, the computer-executable instructions including instructions that are executable to cause the one or more processors to perform at least the following:
allocate a virtual memory address (VA) to a process backing a virtual machine, the VA allocated within a page table entry (PTE) of a page table;
based on one or more memory accesses by the virtual machine to a non-mapped guest-physical memory address (GPA),
identify that the non-mapped GPA is associated with the allocated VA;
allocate an HPA for the accessed GPA;
within the PTE, associate the HPA with the VA;
within a SLAT structure entry, associate the GPA with the HPA; and
set an accessed flag within the SLAT structure entry; and
update aging information, including:
based at least on accessing the PTE while walking a working set of PTEs for the process, identify the SLAT structure entry;
query a value of the accessed flag in the SLAT structure entry;
clear the accessed flag in the SLAT structure entry without invalidating the SLAT structure entry; and
update aging information for at least one of the VA or the HPA based on the queried value of the accessed flag.

* * * * *